(12) United States Patent
Fleck et al.

(10) Patent No.: US 6,434,689 B2
(45) Date of Patent: *Aug. 13, 2002

(54) DATA PROCESSING UNIT WITH INTERFACE FOR SHARING REGISTERS BY A PROCESSOR AND A COPROCESSOR

(75) Inventors: Rod G. Fleck, Mountain View; Roger D. Arnold, Sunnyvale; Bruce Holmer, Belmont; Danielle G. Lemay, Sunnyvale, all of CA (US)

(73) Assignee: Infineon Technologies North America Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,111

(22) Filed: Nov. 9, 1998

(51) Int. Cl.$^7$ ............................................... G06F 15/00
(52) U.S. Cl. ............................ 712/34; 712/23; 712/32; 712/28; 712/200; 712/217
(58) Field of Search ............................... 712/23, 34, 38, 712/200, 217

(56) References Cited

U.S. PATENT DOCUMENTS

| 4,547,849 | A | | 10/1985 | Louie et al. |
| 4,894,768 | A | * | 1/1990 | Iwasaki et al. ............... 712/34 |
| 4,979,102 | A | * | 12/1990 | Tokuume ..................... 709/213 |
| 5,021,991 | A | * | 6/1991 | MacGregor et al. ......... 710/129 |
| 5,119,499 | A | * | 6/1992 | Tonomura et al. ............ 712/34 |
| 5,125,095 | A | * | 6/1992 | Nakazawa et al. ............ 712/34 |
| 5,185,872 | A | * | 2/1993 | Arnold et al. ............... 712/217 |
| 5,304,860 | A | | 4/1994 | Ashby et al. |
| 5,507,000 | A | | 4/1996 | Stewart et al. |
| 5,524,251 | A | * | 6/1996 | Urasaki ........................ 712/36 |
| 5,603,047 | A | * | 2/1997 | Caulk, Jr. .................... 712/23 |
| 5,713,039 | A | * | 1/1998 | Tran ............................. 712/23 |

(List continued on next page.)

FOREIGN PATENT DOCUMENTS

EP 0 651 321 A1 5/1995

OTHER PUBLICATIONS

"The Embedded System Platform, Reconfigurable PCB on Silicon," and "Product Brief," Motorola Semiconductor Products Sector, 4/98, Rev. 1.
"GF250F ProASIC Product Family," Gatefield Corporation 1997.

*Primary Examiner*—Zarni Maung
*Assistant Examiner*—Nabil El-Hady
(74) *Attorney, Agent, or Firm*—Fish & Richardson P.C.

(57) ABSTRACT

An apparatus is described that comprises a data processing unit and at least one coprocessor. The data processing unit comprises a register file having registers, a memory, a plurality of execution units, a coprocessor interface for coupling the at least one coprocessor with the data processing unit, and a pipeline configuration for processing instructions having a fetch stage for fetching an instruction from the memory, a decode stage for decoding an operational code from the instruction, an execution stage for activating one of the execution units, and a write-back stage for God writing back from the execution unit. The data processing unit comprises read-and write-lines coupling the register file with the coprocessor for exchanging operands, at least one control line indicating that the coprocessor is busy, and a plurality of control lines from the decode stage for controlling the coprocessor which are operated upon detection of a coprocessor instruction. The coprocessor is using the registers from the register file during execution of the coprocessor instruction. The coprocessor comprises a decode unit for decoding the coprocessor instruction and a plurality of coprocessor execution units that share the decode unit, the decode unit selects one of the coprocessor execution units upon the coprocessor instruction, and the selected one of the coprocessor execution units performs the coprocessor instruction.

13 Claims, 2 Drawing Sheets

U.S. PATENT DOCUMENTS 5,752,071 A * 5/1998 Tubbs et al. .................. 712/34
5,909,565 A * 6/1999 Morikawa et al. .......... 712/200
5,923,893 A * 7/1999 Moyer et al. ................. 712/38
5,983,338 A * 11/1999 Moyer et al. ................. 712/34
6,003,124 A * 12/1999 Laborie ....................... 712/34
6,061,711 A * 5/2000 Song et al. ................. 709/108

* cited by examiner

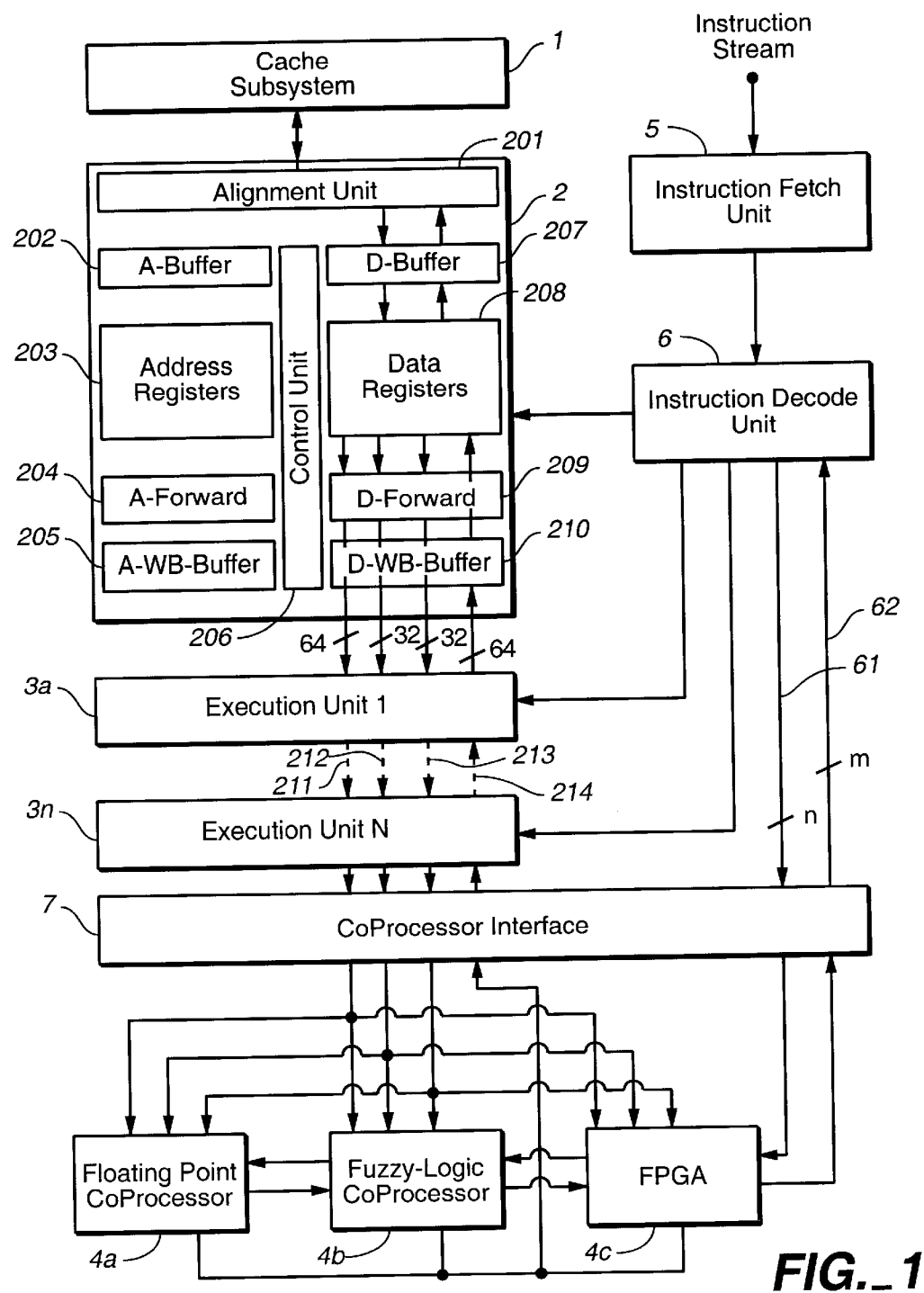
FIG._1

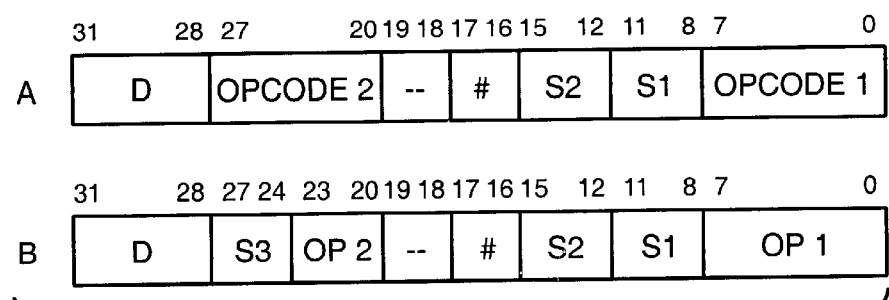
FIG._2
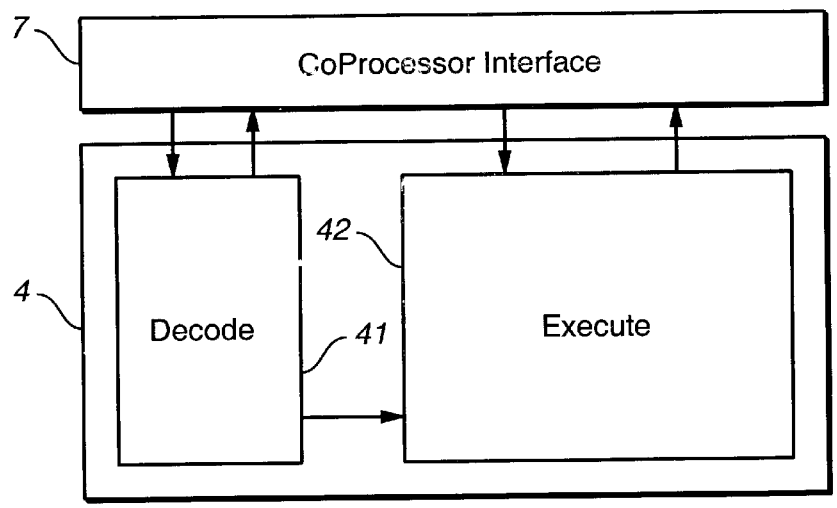
FIG._3
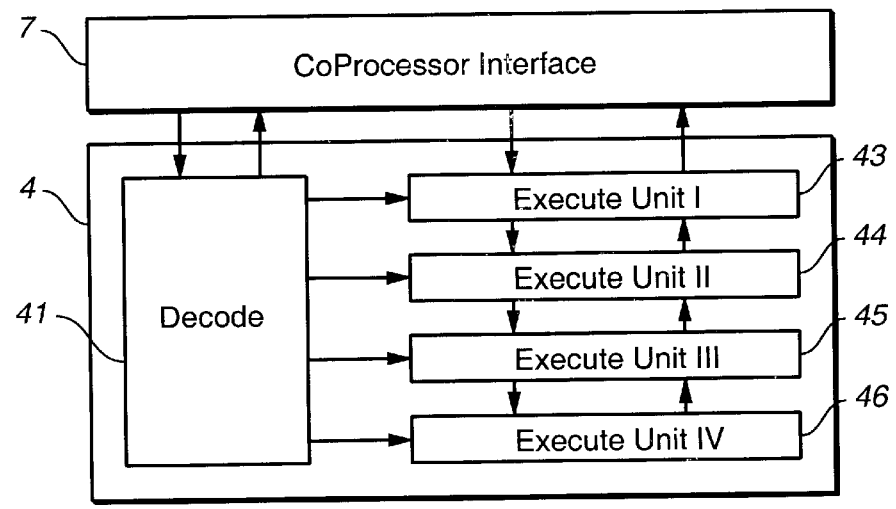
FIG._4

DATA PROCESSING UNIT WITH INTERFACE FOR SHARING REGISTERS BY A PROCESSOR AND A COPROCESSOR

BACKGROUND OF THE INVENTION

The present invention relates to a data processing unit with a coprocessor interface. A coprocessor is used in a data processing system to perform special tasks, such as floating point operations, digital signal processing, etc. Many data processors are capable of working in combination with a coprocessor. Usually, a main processor addresses a coprocessor through the system bus. If the main processor decodes a coprocessor instruction, it transfers, for example by means of an exception routine, the coprocessor instruction and respective data to a coprocessor which performs the instruction and transfers back a result to the main processor. During execution of the coprocessor, the main processor usually is set in a wait state.

U.S. Pat. No. 5,603,047 describes such a system. FIG. 7 of U.S. Pat. No. 5,603,047 shows a block diagram of such a coprocessor having 24 registers. A coprocessor instruction has a specific format which is detected during the decode stage of the pipeline shown in FIG. 2 of U.S. Pat. No. 5,603,047. The respective coprocessor instructions are described in column 20 of the U.S. Pat. No. 5,603,047. They include instructions for loading and storing data and control from or to the coprocessor. The coprocessor can be able to perform a variety of functions which might be selected by various programs which can be selected through respective addresses which are transferred to the coprocessor. The coprocessor executes these programs and when finished, the respective results can be transferred to the main processor through respective transfer instructions.

SUMMARY OF THE INVENTION

In many applications high speed processing of data is necessary. Therefore, there exist a high demand of performing certain tasks within a single cycle of the system clock. Most instructions of known microprocessors or microcontrollers can be executed within a single cycle due to superscalar and superpipeline techniques. Nevertheless, many special instructions are either not available on, for example, reduced instruction set computers, or need a plurality of execution cycles. Even with the addition of coprocessors these tasks cannot be executed in the requested time due to cumbersome transfer protocols between the main processor and a coprocessor.

Therefore, it is an object of the present invention to provide a data processing unit with a coprocessor interface to overcome the above mentioned problems.

This object is achieved according to the present invention by an apparatus that comprises a data processing unit and at least one coprocessor. The data processing unit comprises a register file having registers, a memory, a plurality of execution units, a coprocessor interface for coupling the at least one coprocessor with the data processing unit, and a pipeline configuration for processing instructions having a fetch stage for fetching an instruction from the memory, a decode stage for decoding an operational code from the instruction, an execution stage for activating one of the execution units, and a write-back stage for writing back from the execution unit. The data processing unit comprises read- and write-lines coupling the register file with the coprocessor for exchanging operands, at least one control line indicating that the coprocessor is busy, and a plurality of control lines from the decode stage for controlling the coprocessor which are operated upon detection of a coprocessor instruction. The coprocessor is using the registers from the register file during execution of the coprocessor instruction. The coprocessor comprises a decode unit for decoding the coprocessor instruction and a plurality of coprocessor execution units that share the decode unit, the decode unit selects one of the coprocessor execution units upon the coprocessor instruction, and the selected one of the coprocessor execution units performs the coprocessor instruction.

Because the coprocessor is using the register file of the main processor it can execute instructions as fast as any execution unit, such as the arithmetic logic unit, a shifter, a load/store unit, etc. A coprocessor instruction is decoded and executed in the same manner as any other instruction.

In a further embodiment a field programmable gate array (FPGA) is used as a coprocessor. Thus, a wide variety of additional instructions can be executed, whereby the instruction variety can be expanded dynamically by means of re-programming the FPGA.

BRIEF DESCRIPTION OF THE DRAWINGS

FIG. 1 shows a block diagram of the relevant parts of a data processing unit including a coprocessor interface according to the present invention, FIG. 2 shows the format of a coprocessor instruction, FIG. 3 shows a block diagram of an embodiment of a single coprocessor, and FIG. 4 shows a block diagram of an embodiment of four coprocessors.

DETAILED DESCRIPTION OF THE PREFERRED EMBODIMENT

FIG. 1 shows a memory cache subsystem 1 coupled through a bus with a register file 2. Register file 2 contains an align unit 201, address buffer 202 and data buffer 207, address registers 203 and data registers 208, address forwarding unit 204 and data forwarding unit 209, address write-back buffer 205 and data write-back buffer 210, and a control unit 206. In the preferred embodiment only the data registers are interfaced with the coprocessor. Therefore, only the most relevant connecting lines are shown in FIG. 1 for the sake of a better overview. Nevertheless any kind of register from a register file can be used to interface with the coprocessor interface. The data registers 208 are coupled through data buffer 207 and align unit 201 with the cache memory subsystem 1.

To interface with the different execution units 3a, . . . 3n three different read busses are provided. The first read bus 211 comprises 64 bit lines, the second read bus 212 has 32 bit lines, and the third read bus 213 provides also 32 bit lines. Of course the number of bit lines per read port is freely selectable and depends on the instruction set. Furthermore, a write bus 214 having 64 bit lines is provided. These four busses 211, 212, 213, and 214 allow read and write access to the respective data registers 208 of the register file 2. An instruction fetch unit 5 provides instructions to a following instruction decoder 6. The instruction decoder 6 provides all execution units with respective operational codes and selects the respective registers 203, 208 in the register file 2. A coprocessor interface 7 is provided which is coupled with the four busses 211, 212, 213, and 214. Furthermore, coprocessor interface 7 is coupled through busses 61 and 62 with instruction decoder 6. Bus 61 can have n instruction lines for providing operational code and other information. In, addition, bus 62 has m control lines to provide the pipeline with status information from the coprocessors.

The control bus 61, 62 can have the following functionality: One line can indicate a valid instruction which would be asserted when the integer pipeline is valid. Another line or set of lines could be provided for an instruction sequencer. Depending on the number of instruction cycles needed a 2 bit, 3bit, 4 bit, etc., -wide bus would be provided. A further line can indicate a multi cycle start which would be activated by the coprocessor to indicate when the instruction in the coprocessor decoder is a multi cycle instruction. Yet another line would be activated by the coprocessor to indicate the end of a multi cycle instruction, signaling the last re-inject of the instruction. Also, a multi cycle continue control line can be provided which would be activated by the coprocessor to re-inject an instruction during multi cycle start and end phase. To indicate an invalid opcode a further control line may be provided. Further control lines indicate which coprocessor has to be enabled, for example, two lines can address four different coprocessors. Other control signals may be provided depending on the structure of the coprocessor unit.

The embodiment according to FIG. 1 shows three coprocessors. The number of coprocessors which can be added to the system internally or externally depends on the instruction size of the data processing unit as will be explained later. The first coprocessor 4a in this embodiment shows a floating point coprocessor. The second coprocessor 4b is a fuzzy logic coprocessor and the third coprocessor is a re-programmable coprocessor in form of a FPGA. All coprocessors are coupled with the six busses 211,212,213,214, 61, and 62 through interface 7.

FIG. 2 shows two possible formats A and B of a coprocessor instruction. In this embodiment an instruction is 32 bits long and the bit fields indicating a coprocessor instruction can be one or both of the opcode fields OPCODE 1, OPCODE 2, and OP 1, OP 2, respectively. The bit field D indicates the destination in form of a register number where the result of the respective instruction will be written to. The bit field # indicates the number of the coprocessor for executing the instruction defined in the opcode bit field. Bit fields S1, S2, S3 contain either data register or immediate data for the respective instruction. In this embodiment each of the bit field S1, S2, S3, and D are 4 bits wide, the OPCODE field comprises 12 or 16 bits. The # field has 2 bits, and the 2 bits are not used in both instruction formats A and B indicated as "--".

Instruction fetch unit 5 provides instruction decoder 6 with an instruction from a instruction stream. Instruction decoder 6 determines whether an instruction is designated to a coprocessor by means of the bit field OPCODE 1, OPCODE 2, and OP 1, OP 2, respectively. After decoding of an instruction the coprocessor indicated in the bit field # receives the respective instruction stored in the opcode bit fields and eventually immediate data from one or more of the bit fields S1, S2, S3 through bus 61 and the contents of the selected data registers in bit fields S1, S2, and S3 through the three data read busses 211, 212, and 213. In the following execution cycle the coprocessor executes the instruction decoded by the instruction decoder and writes during the write-back cycle the respective result back to a data register designated in bit field D. Thus, execution of a coprocessor instruction can be as quick as an execution of any execution units. No transfers from or to registers are delaying the process of executing a special instruction because the respective coprocessor does not need its own registers. Nevertheless, a coprocessor may have additional registers which contain data that need not be accessible by the data processing unit.

On the other hand, usually a common known coprocessor needs to be initialized by transferring data to the coprocessor, configuring the coprocessor and transferring the respective instruction to the coprocessor. This creates an overhead affecting the overall speed of the system. Thus, a known coprocessor will stall the respective pipelines for a plurality of cycles. The coprocessor according to the present invention does not need these steps. It can operate directly with the register file of the main CPU. Transfer of data is similar to the transfer of data to regular execution units. Thus every instruction which can be executed in a single cycle can be executed in parallel with another pipeline or multiple pipelines. In the embodiment of FIG. 1 this would be the load/store pipeline coupled with the address register file 203, and the units 202, 204, 205. The pipelines only get stalled with a multi-cycle instruction in a similar manner as this would occur with any execution unit of the central processing unit. For this purpose, control lines indicating a multi-cycle start, a multi-cycle end, and a multi-cycle continuation described above are used.

Using a FPGA as a coprocessor comprises additional benefits. Depending on the specific task a microcontroller system using a data processing unit according to the present invention is programmed initially. The FPGA may be re-programmed and adapted to each specific task of a complex program dynamically. For example an instruction for performing a convolution operation is not available in standard instruction sets of either a RISC or a CISC processor. Such an instruction forms, for example, a 32 bit long word out of two 16 bit words by alternatively concatenating the bits of each input word. For example, if the first input word contains only "1111 . . . 111" and the second input word contains only "0" the result would be a 32 bit word with alternating "0" and "1". In other words, the resulting word consists of bit 16 of the first word, followed by bit 16 of the second word, followed by bit 15 of the first word and so on. To perform such an operation a plurality of instructions has to be executed in a conventional microprocessor system. A FPGA can be easily programmed to couple a multiplexer or respective logic with the input and output lines to perform this task in a single cycle. Because such an instruction can be performed with the registers of the data processing unit no additional transfers are necessary.

The embodiment of a coprocessor interface according to the present invention provides three data read busses 211, 212, and 213 and one write-back bus 214. Thus, digital signal processing functionality can be provided by the coprocessors. For example, a single instruction can perform a multiplication of two operands and an addition of the result with a third operand. The final result is written into a designated register. All three operands can be transferred during the decode cycle to the respective coprocessor and written back to the destination register during the write-back cycle.

FIG. 3 shows the main blocks of a coprocessor 4 coupled with a coprocessor interface according to the invention. Each coprocessor may have a decode unit 41 which receives the respective coprocessor instruction from the CPU. Decode unit 41 decodes the instruction, for example, bits 16 to 23 according to an instruction as shown in FIG. 2. Then, decode unit 41 provides an execute unit 42 coupled with decode unit 41 with the respective control signals. Execute unit may contain multiplexers, adders, shifter, etc. connected in a way to perform respective functions. The control signals provided by decode unit 41 activate the respective units to operate in a predetermined way. The result is passed to the coprocessor interface, which couples the result bus to the write back bus of the integer pipeline. Thus, the coprocessor behaves in a similar way as an additional execution unit as shown in FIG. 1.

FIG. 4 shows a solution where multiple execution units 43, 44, 45, and 46 share the same decode unit 41. Decode unit 41 decodes the respective coprocessor instruction and selects one of the execution units 43, 44, 45, or 46 which performs the respective function. The result is again written back through interface 7 into the register file.

In case of a longer execution time needed by a coprocessor, the pipeline of the data processing unit needs to be stalled. Thus, additional control lines 62 are provided which supply information from the coprocessors to the pipeline as described above. For example, the coprocessor executing a respective instruction which needs a plurality of system cycles sends a busy signal through bus 62 to the instruction decode unit 6 to stall the pipeline.

The coprocessor interface includes all necessary buffers and logic to feed necessary signals from or to the coprocessors. Thus, the coprocessors according to the present invention can be coupled with the coprocessor interface 7 either on-chip or externally. In the preferred embodiment the coprocessors are coupled with the integer pipeline. In different embodiments with different pipeline structures the coprocessor interface can also be coupled with a different type of pipeline or with more than one pipeline. Thus, two or more coprocessors could operate in parallel.

What is claimed is:

1. Apparatus comprising:
   a) a data processing unit including
      1) a register file having registers,
      2) a memory,
      3) a first bus coupling said register file with said memory,
      4) a plurality of execution units,
      5) a pipeline configuration for processing instructions having a fetch stage for fetching an instruction from said memory, a decode stage for decoding an operational code from said instruction, an execution stage for activating one of said execution units, and a write-back stage for writing back from said execution unit;
   b) a coprocessor;
   c) a coprocessor interface for coupling said coprocessor with said data processing unit;
   d) a second bus including read-lines coupling said register file with said plurality of execution units and said coprocessor;
   e) a third bus including write-lines couplings said register file with said plurality of execution units and said coprocessor, the second and third buses exchanging operands between said registers and said plurality of execution units and between said registers and said coprocessor;
   f) at least one control line from said coprocessor to said pipeline configuration for indicating that said coprocessor is busy; and
   g) a plurality of control lines from said decode stage in said data processing unit to said coprocessor to provide said operational code to said coprocessor, the plurality of control lines operated upon detection by the decode stage that the instruction is a coprocessor instruction;
   h) whereby said coprocessor uses said registers from said register file during execution of a coprocessor instruction.

2. Apparatus according to claim 1, wherein said read- and write-lines include a plurality of read lines to read at least two operands from said register file and a plurality of write lines to write-back at least one operand.

3. Apparatus according to claim 1, wherein each instruction contains a bit field for use by the decode stage to determine whether the instruction is a coprocessor instruction and a bit field indicating the operational code for said coprocessor.

4. Apparatus according to claim 1, wherein a pipeline execution is stalled upon a busy signal from said coprocessor.

5. Apparatus according to claim 1 further comprising programming means for programming a programmable gate array and wherein said coprocessor is formed by a programmable gate array.

6. Apparatus according to claim 1 further having a control line that is capable of being activated by the coprocessor to indicate a multi cycle start when an instruction in the coprocessor is a multi cycle instruction.

7. Apparatus according to claim 6 further having a control line that is capable of being activated by the coprocessor to indicate an end of a multi cycle instruction.

8. Apparatus according to claim 1 further having a control line that is capable of being activated by the coprocessor to re-inject an instruction to the data processing unit during a multi-cycle start and end phase.

9. Apparatus according to claim 1, wherein said coprocessor includes a coprocessor configured to perform a convolution operation in a single cycle.

10. Apparatus according to claim 1, wherein said coprocessor includes a fuzzy logic coprocessor.

11. Apparatus according to claim 1 wherein said coprocessor includes coprocessor registers not accessible by the data processing unit.

12. Apparatus according to claim 1, wherein the coprocessor comprises a decode unit for decoding said coprocessor instruction and at least one execution unit for executing said coprocessor instruction.

13. Apparatus according to claim 1, wherein the coprocessor comprises a plurality of execution units and said decode unit selects one of the execution units upon said coprocessor instruction.

* * * * *